US011359116B2

(12) United States Patent
Kodama et al.

(10) Patent No.: US 11,359,116 B2
(45) Date of Patent: *Jun. 14, 2022

(54) THERMOCURABLE ELECTROCONDUCTIVE ADHESIVE

(71) Applicant: THREEBOND CO., LTD., Tokyo (JP)

(72) Inventors: Tomoya Kodama, Tokyo (JP); Soichi Ota, Tokyo (JP); Masayuki Osada, Tokyo (JP); Hitoshi Mafune, Tokyo (JP); Makoto Kato, Tokyo (JP); Kanako Morii, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 482 days.

This patent is subject to a terminal disclaimer.

(21) Appl. No.: 16/330,526

(22) PCT Filed: Aug. 17, 2017

(86) PCT No.: PCT/JP2017/029568
§ 371 (c)(1),
(2) Date: Mar. 5, 2019

(87) PCT Pub. No.: WO2018/047598
PCT Pub. Date: Mar. 15, 2018

(65) Prior Publication Data
US 2021/0277289 A1   Sep. 9, 2021

(30) Foreign Application Priority Data

Sep. 6, 2016   (JP) .............................. JP2016-173774

(51) Int. Cl.
| C09J 9/02 | (2006.01) |
| C09J 11/04 | (2006.01) |
| C09J 11/06 | (2006.01) |
| C09J 133/08 | (2006.01) |
| H01B 1/20 | (2006.01) |
| C08K 3/08 | (2006.01) |
| C08K 9/04 | (2006.01) |

(52) U.S. Cl.
CPC ................ C09J 9/02 (2013.01); C09J 11/04 (2013.01); C09J 11/06 (2013.01); C09J 133/08 (2013.01); H01B 1/20 (2013.01); C08K 3/08 (2013.01); C08K 9/04 (2013.01); C08K 2003/0806 (2013.01)

(58) Field of Classification Search
CPC ..................................... C09J 9/02; C09J 11/04
See application file for complete search history.

(56) References Cited

U.S. PATENT DOCUMENTS

| 8,728,352 B2 * | 5/2014 | Bae ............................ C09J 9/02 252/514 |
| 10,266,729 B2 * | 4/2019 | Ota ........................ C08K 5/14 |
| 2019/0177579 A1 * | 6/2019 | Ota ....................... C08G 18/09 |
| 2019/0194443 A1 * | 6/2019 | Ota ........................ C09J 133/10 |

FOREIGN PATENT DOCUMENTS

| CN | 105814093 A | 7/2016 |
| JP | 2004-018715 A | 1/2004 |
| JP | 2005-053733 A | 3/2005 |
| JP | 2007262243 A | 10/2007 |
| JP | 2013-098230 A | 5/2013 |
| JP | 2013-253152 A | 12/2013 |
| JP | 2015-135805 A | 7/2015 |
| JP | 2016-117860 A | 6/2016 |
| WO | 2015093136 A1 | 6/2015 |

OTHER PUBLICATIONS

International Search Report with English translation and Written Opinion dated Nov. 7, 2017 in corresponding International Application No. PCT/JP2017/029568; 13 pages.
Japanese Office Actiondated Jun. 8, 2021, in connection with corresponding JP Application No. 2018-538330 (11 pp., including machine-generated English translation).
Chinese Office Action dated Sep. 30, 2020, in connection with corresponding CN Application No. 201780054499.6 (12 pp., including machine-generated English translation).
Chinese Office Action dated Jun. 4, 2021, in connection with corresponding CN Application No. 201780054499.6 (12 pp., including machine-generated English translation).
Japanese Office Action dated Oct. 5, 2021, in connection with corresponding JP Application No. 2018-538330 6 pp., including machine-generated English translation).
Korean Office Action dated Aug. 18, 2021, in connection with corresponding KR Application No. 10-2019-7004892 (8 pp., including machine-generated English translation).
Office Action dated Jan. 12, 2022 in Chinese Patent Application No. 201780054499.6 (with English translation); 11 pages.
Office Action dated Jan. 27, 2022, in connection with corresponding Vietnamese Application No. 1-2019-01133 (4 pp., including machine-generated English translation).

* cited by examiner

*Primary Examiner* — Vickey Nerangis
(74) *Attorney, Agent, or Firm* — Maier & Maier, PLLC

(57) ABSTRACT

Conventionally, there was a need to add a large amount of electroconductive particles for improving conductivity, but when the electroconductive particles were added too much, initial viscosity was increased, and at the same time, it was difficult to stabilize preservation stability. However, conductivity can be improved without adding a large amount of the electroconductive particles by selecting a monomer, and at the same time, preservation stability can be stabilized by using certain electroconductive particles. A thermocurable electroconductive adhesive including components (A) to (D): component (A): an oligomer having a (meth)acryl group; component (B): a monomer having one methacryl group in a molecule; component (C): an organic peroxide having a specific structure; and component (D): electroconductive particles which are surface-treated with a stearic acid.

5 Claims, No Drawings

THERMOCURABLE ELECTROCONDUCTIVE ADHESIVE

FIELD

The present invention relates to an isotropic electroconductive adhesive having thermocurability.

BACKGROUND

In a thermocurable composition consisting of an oligomer having a (meth) acryl group and a monomer, using a stabilizer such as a polymerization inhibitor is known, as a method of maintaining preservability (hereinafter, an acryl group and a methacryl group are also referred to as a (meth) acryl group). However, when too much of the stabilizer is added, curability is lowered, and in the worst case, it is known that curing does not occur. In addition, in the case of a n electroconductive adhesive as described in JP 2000-53733 A, when electroconductive particles such as silver powder are added thereto in a large amount, the adhesive is easily gelled, which may be due to metal ions affecting peroxides. In particular, when the adhesive is stored in a non-air permeable container, there is a problem in that gelation occurs within a short time. This is due to the fact that in the cured form of a (meth)acryl resin composition, generally, photocurability, thermocurability, and anaerobic curability can be imparted by changing the kind of curing agent. Therefore, it is considered that though a (meth)acryl resin composition to which thermocurability is imparted is designed, anaerobic curability potentially remains, whereby when the adhesive is stored in non-air permeable container, anaerobic curability is expressed so that the adhesive is gelled earlier.

In addition, in the case of the electroconductive adhesive as described in JP 2000-53733 A, when electroconductive particles such as silver powder are added thereto in a large amount, conductivity is improved to an extent, but a problem in preservation stability occurs, and thus, it is required that only a small amount of added electroconductive particles expresses good conductivity.

SUMMARY

Conventionally, it was necessary to add a large amount of electroconductive particles for improving conductivity, and when a large amount of electroconductive particles were added, initial viscosity was increased, and at the same time, it was difficult to stabilize preservation stability.

The present inventors studied hard to achieve the object, and found a technique related to a thermocurable electroconductive adhesive, thereby completing the present invention.

The gist of the present invention will be described below A first embodiment of the present invention is a thermocurable electroconductive adhesive including the following components (A) to (D):

Component (A): an oligomer having a (meth)acryl group;
Component (B): a monomer having one methacryl group in a molecule;
Component (C): an organic peroxide having a structure of the following General Formula 1; and
Component (D): electroconductive particles which are surface-treated with a stearic acid.

A second embodiment of the present invention is the thermocurable electroconductive adhesive described in the first embodiment, which does not include an oligomer other than the component (A) and a monomer other than the component (B).

A third embodiment of the present invention is the thermocurable electroconductive adhesive described in the first embodiment or the second embodiment, wherein a ratio of the component (A) and the component (B) (part by mass) is 20:80 to 80:20, with respect to a total of 100 parts by mass of the component (A) and the component (B).

A fourth embodiment of the present invention is the thermocurable electroconductive adhesive described in any one of the first to third embodiments, which does not include rubber, an elastomer, and a thermoplastic resin.

A fifth embodiment of the present invention is the thermocurable electroconductive adhesive described in any one of the first to fourth embodiments, wherein the component (B) is a monomer having one hydroxyl group and one methacryl group.

A sixth embodiment of the present invention is the thermocurable electroconductive adhesive described in any one of the first to fifth embodiments, wherein the component (C) is an organic peroxide having a structure of the following General Formula 2.

A seventh embodiment of the present invention is the thermocurable electroconductive adhesive described in any one of the first to sixth embodiments, in which 1 to 10 parts by mass of the component (C) is included, with respect to a total of 100 parts by mass of the component (A) and the component (B).

An eighth embodiment of the present invention is the thermocurable electroconductive adhesive described in any one of the first to seventh embodiments, which does not include electroconductive particles other than the component (D).

A ninth embodiment of the present invention is the thermocurable electroconductive adhesive described in any one of the first to eighth embodiments, wherein 60 to 80% by mass of the component (D) is included, with respect to the entire thermocurable electroconductive adhesive.

DETAILED DESCRIPTION

The thermocurable electroconductive adhesive of the present invention is characterized by including a component (A): an oligomer having a (meth) acryl group, a component (B): a monomer having one methacryl group in a molecule, a component (C): an organic peroxide having a structure of the following General Formula 1, and a component (D): electroconductive particles which are surface-treated with a stearic acid. By having this constitution, even in the case that the electroconductive particles are not included, for example, at more than 80% by mass, with respect to the entire composition, the present invention can select a monomer to improve conductivity, simultaneously with using specific electroconductive particles to stabilize preservation stability, thereby providing a thermocurable electroconductive adhesive having both conductivity and preservation stability.

The thermocurable electroconductive adhesive of the present invention (also simply referred to as the composition) will be described below in detail. The component (A) which can be used in the present invention is an oligomer having a (meth)acryl group. Considering the curability of the composition, it is preferred that the oligomer is a polymer body having a number average molecular weight of 500 or more, and the component (A) is an oligomer having two or more (meth)acryl groups. The oligomer can be exemplified as an epoxy modified oligomer having an acrylic acid added to a glycidyl group, a urethane modified oligomer obtained by polymerizing polyol with polyisocyanate and a monomer having a (meth) acryl group having an acrylic acid or a hydroxyl group, an oligomer having a (meth)acryl group directly added to polyether polyol or polyester polyol, and the like, and the main chain thereof can be exemplified as bisphenol A, novolac phenol, polybutadiene, polyester, polyether, and the like; however, the present invention is not limited thereto. Considering the heat-curability by the component (C), it is preferred that the thermocurable electroconductive adhesive of the present invention does not include an oligomer other than the oligomer having a (meth)acryl group which is the component (A).

The oligomer having a (meth)acryl group which is the commercially available component (A) can be exemplified as 8402 (aliphatic urethane acrylate (the number of functional groups: 2)) and 220 (aromatic urethane acrylate (the number of functional groups: 6)) of an EBECRYL series manufactured by DAICEL-ALLNEX LTD., and the like. In addition, M-8030 (polyester polyfunctional acrylate) of an Aronix series manufactured by Toagosei Company, Limited, and the like can be used, but the present invention is not limited thereto.

The component (B) which can be used in the present invention is a monomer having one methacryl group in the molecule. Here, considering the ability to lower viscosity of the composition, it is preferred that the monomer is a compound having a molecular weight less than 500. From the viewpoint of improving conductivity, it is preferred that the thermocurable electroconductive adhesive of the present invention does not include a monomer other than the monomer having one methacryl group in the molecule which is the component (B). In addition, from the viewpoint of improving conductivity, it is preferred that the component (B) is a monomer having one hydroxyl group and one methacryl group in the molecule.

A specific example of the component (B) can include methacrylic acid, laurylmethacrylate, stearylmethacrylate, ethyl carbitol methacrylate, tetrahydrofurfuryl methacrylate, caprolactone modified tetrahydrofurfuryl methacrylate, cyclohexyl methacrylate, dicyclopentanylmethacrylate, isobornyl methacrylate, benzyl methacrylate, phenyl methacrylate, phenoxyethyl methacrylate, phenoxy diethyleneglycol methacrylate, phenoxy tetraethyleneglycol methacrylate, nonyl phenoxyethyl methacrylate, nonyl phenoxy tetraethyleneglycol methacrylate, methoxy diethyleneglycol methacrylate, ethoxy diethylene glycol methacrylate, butoxyethyl methacrylate, butoxy triethyleneglycolmethacrylate, 2-ethylhexyl polyethylene glycol methacrylate, nonylphenyl polypropylene glycol methacrylate, methoxydipropyleneglycolmethacrylate, glycidylmethacrylate, 2-hydroxyethyl methacrylate, 2-hydroxypropyl methacrylate, glycerol methacrylate, polyethylene glycol methacrylate, polypropylene glycol methacrylate, epichlorohydrin (hereinafter, abbreviated to ECH) modified butyl methacrylate, ECH modified phenoxy methacrylate, ethylene oxide (hereinafter, abbreviated to EO) modified phthalic methacrylate, EO modified succinic methacrylate, caprolactone modified 2-hydroxyethyl methacrylate, or the like, but the present invention is not limited thereto.

A ratio of the component (A) and the component (B) (parts by mass) is preferably 20:80 to 80:20, and more preferably 40:60 to 60:40, with respect to a total of 100 parts by mass of the component (A) and the component (B). When the component (A) is included at 20 parts by mass or more, curability at low temperature can be maintained, and when the component (A) is included at 80 parts by mass or less, viscosity can be lowered, whereby a handling property is good.

The component (C) which can be used in the present invention is an organic peroxide having a structure of the following General Formula 1. Particularly preferably, the component (C) is an organic peroxide having a structure of the following General Formula 2. Though the specific reason is not known, by using the organic peroxide, an effect of having both excellent conductivity and preservation stability can be more remarkably expressed, as described above. Here, $R^1$ and $R^2$ independently of each other denote a hydrocarbon group, and may be linear or cyclic. The component (C) can be exemplified as di-n-propyl-peroxydicarbonate, di-iso-propyl-peroxydicarbonate, di(4-t-butyl cyclohexyl)peroxydicarbonate (=bis(4-t-butyl cyclohexyl) peroxydicarbonate), di(2-ethyl hexyl)peroxydicarbonate, di-sec-butyl-peroxydicarbonate, or the like, but the present invention is not limited thereto.

[Chemical Formula 1]

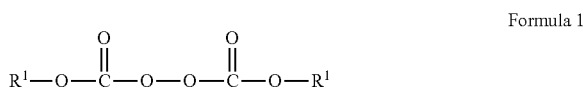

Formula 1

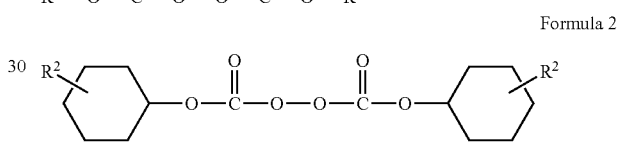

Formula 2

A specific example of the component (C) can include NPP-50M, IPP-50, IPP-27, TCP, OPP, and SBP as a PEROYL series manufactured by NOF CORPORATION, and the like, but the present invention is not limited thereto.

The component (C) is included preferably at 1 to 10 parts by mass, more preferably 2 to 9 parts by mass, and more preferably 3 to 8 parts by mass, with respect to a total of 100 parts by mass of the component (A) and the component (B). When the component (C) is included at 1 part by mass or more, curability at low temperature can be expressed, and when at 10 parts by mass or less, preservation stability can be maintained.

The component (D) which can be used in the present invention is electroconductive particles which are surface-treated with a stearic acid. Though the specific reason is not known, silver powder which is surface-treated with a stearic acid has a particular effect of improving preservation stability. Therefore, it is preferred that electroconductive particles other than the component (D) are not added to the thermocurable electroconductive adhesive of the present invention, from the viewpoint of improving preservation stability.

The electroconductive particles only have to express electrical conductivity, and the particle material and the particle shape are not limited. The material of the electroconductive particles can be exemplified as silver powder, nickel powder, palladium powder, carbon powder, tungsten powder, plated powder, and the like, and in particular, silver powder having excellent electrical conductivity is preferred. In addition, the shape of the electroconductive particles can be exemplified as a spherical shape, an amorphous shape, a flake (scale) shape, a filament (needle) shape, a dendritic shape, and the like. A plurality of the kinds may be combined and used. Particularly, in terms of low raw material costs, electroconductive particles obtained by subjecting an insulating metal oxide, nickel powder, or insulator powder to silver plating are preferred. An insulating oxide metal can be specifically exemplified as copper powder, aluminum powder, iron powder, or the like, and is a metal which has passivation formed on the metal surface and does not express conductivity. In order to be kneaded in a resin component, it is preferred that the electroconductive particles have a 50% average particle diameter (d50) of 100 μm or less. The electroconductive particles are preferably silver powder and silver plated powder, considering price and conductivity. Here, the average particle diameter is measured by a laser granulometer, SEM, or the like, but the present invention is not limited thereto.

For expressing conductivity having isotropy, the component (D) is included preferably at 60 to 80% by mass, and more preferably at 70 to 80% by mass, with respect to the entire thermocurable electroconductive adhesive. When the component (D) is included at 60% by mass or more, conductivity is expressed, and when at 80% by mass or less, being stringy and the like do not occur so that there is no problem in workability.

In addition, to the extent that the features of the present invention are not impaired, a stabilizer may be added as a component (E). As the component (E) (stabilizer), a phosphate ester compound, a polymerization inhibitor, a chelating agent, and the like are included. In order to capture a generated radical species to maintain preservation stability, a polymerization inhibitor can be used. In addition, in order to capture generated metal ions, a chelating agent can be used.

A specific example of the phosphate ester compound which is the component (E) can include ethyl acid phosphate, butyl acid phosphate, butoxyethyl acid phosphate, oleyl acid phosphate, 2-ethyl hexyl acid phosphate, 2-hydroxyethyl methacrylate acid phosphate, dibutyl phosphate, and the like, but the present invention is not limited thereto. Though a specific reason is not known, the phosphate ester compound has an effect of improving preservation stability. Here, 2-hydroxyethyl methacrylate acid phosphate also corresponds to the component (B), but has low ability to lower viscosity of the composition, and thus, the phosphate ester compound is not included in the component (B). In addition, since the phosphate ester compound having a (meth)acryl group in the molecule is involved in radical polymerization at the time of curing, there occurs no volatilized matter other than a cured product when the cured product is heated, and thus, outgas can be reduced.

A specific example of the polymerization inhibitor which is the component (E) can include quinone-based polymerization inhibitors such as hydroquinone, methoxy hydroquinone, benzoquinone, and p-tert-butyl catechol; alkylphenol-based polymerization inhibitors such as 2,6-di-tert-butyl phenol, 2,4-di-tert-butyl phenol, 2-tert-butyl-4,6-dimethyl phenol, 2,6-di-tert-butyl-4-methyl phenol (BHT), and 2,4,6-tri-tert-butyl phenol; amine-based polymerization inhibitors such as alkylated diphenylamine, N,N'-diphenyl-p-phenylene diamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, and 1-hydroxy-4-benzoyloxy-2,2,6,6-tetramethylpiperidine; N-oxyl-based polymerization inhibitors such as 2,2,6,6-tetramethylpiperidine-N-oxyl, 4-hydroxy-2,2,6,6-tetramethylpiperidine-N-oxyl, and 4-benzoyloxy-2,2,6,6-tetramethylpiperidine-N-oxyl, and the like, but the present invention is not limited thereto.

A specific example of a chelating agent which is the component (E) can include EDTA.2Na, EDTA.4Na(4NA: ethylene diamine-N, N, N', N'-tetraacetic acid, tetrasodium salt, tetrahydrate) manufactured by Dojindo Molecular Technologies, Inc., or the like, and a chelating agent which is liquid at 25° C. can be exemplified as MZ-8 manufactured by Chelest corporation, or the like, but the present invention is not limited thereto.

When the stabilizer which is the component (E) is added too much, preservation stability is improved, but reactivity becomes slow, and thus, an amount of added component (E) is preferably 0.001 to 1.0% by mass, more preferably 0.01 to 0.9 parts by mass, and still more preferably 0.1 to 0.8 parts by mass, with respect to the entire thermocurable electroconductive adhesive.

In addition, to the extent that the features of the present invention are not impaired, a filler other than the electroconductive particles can be added. The filler other than the electroconductive particles is classified into an inorganic filler and an organic filler. The inorganic filler can be exemplified as metal powder which does not express conductivity (metal powder having passivation formed on powder surface by oxidation), alumina powder, calcium carbonate powder, talc powder, silica powder, fumed silica powder, or the like, and the organic filler can be exemplified as acryl powders, rubber particles, styrene particles, or the like (a particle material which is dispersed as it is as a filler and used), but the present invention is not limited thereto. By adding the filler, viscosity or thixotropy can be controlled, and at the same time, strength can be improved. Powder properties such as the average particle diameter or the shape are not particularly limited, however, considering ease of dispersion to an adhesive and nozzle clogging, a 50% average particle diameter (d50) is preferably 0.001 to 50 μm. In particular, fumed silica powder imparts thixotropy simultaneously with maintaining preservation stability, when added. A specific example of the fumed silica powder can include AEROSIL R805, R972 manufactured by NIPPON AEROSIL CO., LTD., or the like, but the present invention is not limited thereto. Here, the average particle diameter is measured by a laser granulometer, an SEM, or the like, but the present invention is not limited thereto.

It is preferred that the filler is added at 0.1 to 10 parts by mass, with respect to a total of 100 parts by mass of the component (A) and the component (B). When 0.1 parts by mass or more of the filler is added, flowability is stabilized, and at the same time, workability can be improved, and when 10 parts by mass or less of the filler is added, preservation stability can be maintained.

To the extent that the features of the present invention are not impaired, an appropriate amount of an additive, for example, a coloring agent such as a pigment and a dye, a flame retardant, an antioxidant, an antifoaming agent, a coupling agent, a levelling agent, and a rheology controlling agent may be combined with the composition (thermocurable electroconductive adhesive) of the present invention. By adding the additive, an adhesive or the cured product thereof having excellent conductivity, resin strength, adhesion strength, workability, preservation stability, or the like can be obtained. However, since interruption in workability such as being stringy occurs with increased viscosity, it is preferred that rubber, an elastomer, and a thermoplastic resin (a material which is dissolved in (compatibilized with) acryl or epoxy and used) are not included. Here, the rubber is not particularly limited, but can include, for example, natural rubber; synthetic rubber such as isoprene rubber, butadiene rubber, styrene.butadiene rubber, chloroprene rubber, nitrile rubber, polyisobutylene (butyl rubber), ethylene propylene rubber, chlorosulfonated polyethylene, acryl rubber, fluorine rubber, epichlorohydrin rubber, urethane rubber, and silicone rubber, and the like. The elastomer is not particularly limited, but can include, for example, (thermoplastic) elastomers such as styrene-based, olefin/alkene-based, vinyl chloride-based, urethane-based, and amide-based elastomers. The thermoplastic resin is not particularly limited, but can include, for example, polyalkylenes such as polyethylene, high density polyethylene, medium density polyethylene, low density polyethylene, and polypropylene, polyvinyl chloride, polyvinylidene chloride, polystyrene, polyvinyl acetate, polyurethane, polytetrafluoroethylene, an ABS resin (acrylonitrile butadiene styrene resin), an AS resin, an acryl resin, polyamide, polyacetal, polycarbonate, modified polyphenylene ether, polyesters such as polyethylene terephthalate, glass fiber reinforced polyethylene terephthalate, and polybutylene terephthalate, cyclic polyolefin, polyphenylene sulfide, polytetrafluoroethylene, polysulfone, polyethersulfone, non-crystalline polyarylate, a liquid crystal polymer, polyetheretherketone, thermoplastic polyimide, polyamideimide, and the like. All of them are materials which are dissolved in (compatibilized with) acryl or epoxy and used, as described above.

EXAMPLES

The present invention will be described in more detail by the following Examples, however, the technical scope of the present invention is not limited to those Examples only. Hereinafter, the thermocurable electroconductive adhesive is also simply referred to as an adhesive.

Examples 1 to 5, and Comparative Examples 1 to 7

The following components were prepared for preparing the adhesive.
Component (A): an oligomer having a (meth)acryl group
Aliphatic urethane acrylate (the number of functional groups: 2) (EBECRYL8402, manufactured by DAICEL-ALLNEX LTD.)
Polyester polyfunctional acrylate (Aronix M-8030, manufactured by Toagosei Company, Limited)
Aromatic urethane acrylate (the number of functional groups: 6) (EBECRYL220, manufactured by DAICEL-ALLNEX LTD.)
Component (B): a monomer having one methacryl group in the molecule
Isobornyl methacrylate (LIGHT ESTER IBX, manufactured by KYOEISHA CHEMICAL Co., LTD.)
2-hydroxypropyl methacrylate (LIGHT ESTER HOP(N), manufactured by KYOEISHA CHEMICAL Co., LTD.)
Component (B'): a monomer other than component (B)
Isobornylacrylate (LIGHT ACRYLATE IBXA, manufactured by KYOEISHA CHEMICAL Co., LTD.)
2-hydroxypropyl acrylate (LIGHT ACRYLATE HOP-A (N), manufactured by KYOEISHA CHEMICAL Co., LTD.)
Component (C): an organic peroxide having a structure of General Formula 1
Bis(4-t-butylcyclohexyl)peroxydicarbonate (solid at 25° C.) (PEROYL TCP, manufactured by NOF CORPORATION)
Component (D): electroconductive particles which are surface-treated with a stearic acid
Silver powder 1: flake type silver powder which is surface-treated with a stearic acid, having the following powder properties:
Tap density: 3.70 g/cm$^3$
50% average particle diameter (d50): 1.2 μm (laser granulometer)
BET specific surface area: 2.01 m$^2$/g
Silver powder 2: flake type silver powder which is surface-treated with a stearic acid, having the following powder properties:
Tap density: 2.65 g/cm$^3$
50% average particle diameter (d50): 7.4 μm (laser granulometer)
BET specific surface area: 1.75 m$^2$/g
Component (D'): electroconductive particles other than component (D)
Silver powder 3: flake type silver powder which is surface-treated with an oleic acid, having the following powder properties:
Tap density: 3.60 g/cm$^3$
50% average particle diameter (d50): 1.4 μm (laser granulometer)
BET specific surface area: 2.13 m$^2$/g
Silver powder 4: untreated amorphous silver powder, having the following powder properties:
Tap density: 1.85 g/cm$^3$
BET specific surface area: 0.26 m$^2$/g
Other components; component (E): stabilizer
2,6-di-tert-butyl-4-methyl phenol (BHT) (reagent)
2-hydroxyethyl methacrylate acid phosphate (JPA-514, manufactured by JOHOKU CHEMICAL CO., LTD.)

The component (A), the component (B) (or the component (B')), and the component (E) as other components were weighed, added to a stirring vessel, and stirred for 1 hour. Thereafter, the component (D) (or the component (D')) was weighed, added to the stirring vessel, and stirred for 1 hour. Finally, the component (C) was weighed, added to the stirring vessel, and further stirred for 1 hour, thereby preparing the adhesives (thermocurable electroconductive adhesives) of Examples 1 to 5 and Comparative Examples 1 to 7. Detailed amounts of preparation followed Table 1, and the numerical values are all expressed in parts by mass.

TABLE 1-1

| Component | Raw material | Example 1 | Example 2 | Example 3 | Example 4 | Example 5 |
|---|---|---|---|---|---|---|
| Component (A) | EBECRYL8402 | 40 | 40 | | | |
| | AronixM-8030 | | | 40 | 40 | |
| | EBECRYL220 | | | | | 40 |
| Component (B) | IBX | 60 | | 60 | | 60 |
| | HOP (N) | | 60 | | 60 | |
| Component (B') | IBXA | | | | | |
| | HOP-A(N) | | | | | |
| Component (C) | TCP | 5 | 5 | 5 | 5 | 5 |
| Component (D) | Silver powder 1 | 250 | 250 | 250 | 250 | 250 |
| | Silver powder 2 | 70 | 70 | 70 | 70 | 70 |

TABLE 1-1-continued

| Component | Raw material | Example 1 | Example 2 | Example 3 | Example 4 | Example 5 |
|---|---|---|---|---|---|---|
| Component (D') | Silver powder 3 | | | | | |
| | Silver powder 4 | | | | | |
| Other components (E) | BHT | 0.1 | 0.1 | 0.1 | 0.1 | 0.1 |
| | JPA-514 | 0.15 | 0.15 | 0.15 | 0.15 | 0.15 |
| Total | | 425.25 | 425.25 | 425.25 | 425.25 | 425.25 |
| Ratio of component (D) (or component (D')) with respect to the total | | 75.2 | 75.2 | 75.2 | 75.2 | 75.2 |

TABLE 1-2

| Component | Raw material | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component (A) | EBECRYL8402 | 40 | 40 | | | | 40 | 40 |
| | AronIxM-8030 | | | 40 | 40 | | | |
| | EBECRYL220 | | | | | 40 | | |
| Component (B) | IBX | | | | | | 60 | 60 |
| | HOP (N) | | | | | | | |
| Component (B') | IBXA | 60 | | 60 | | 60 | | |
| | HOP-A(N) | | 60 | | 60 | | | |
| Component (C) | TCP | 5 | 5 | 5 | 5 | 5 | 5 | 5 |
| Component (D) | Silver powder 1 | 250 | 250 | 250 | 250 | 250 | | |
| | Silver powder 2 | 70 | 70 | 70 | 70 | 70 | 70 | 70 |
| Component (D') | Silver powder 3 | | | | | | 250 | |
| | Silver powder 4 | | | | | | | 250 |
| Other components (E) | BHT | 0.1 | 0.1 | 0.1 | 0.1 | 0.1 | 0.1 | 0.1 |
| | JPA-514 | 0.15 | 0.15 | 0.15 | 0.15 | 0.15 | 0.15 | 0.15 |
| Total | | 425.25 | 425.25 | 425.25 | 425.25 | 425.25 | 425.25 | 425.25 |
| Ratio of component (D) (or component (D')) with respect to the total | | 75.2 | 75.2 | 75.2 | 75.2 | 75.2 | 75.2 | 75.2 |

For the adhesives (or the cured products thereof) of Examples 1 to 5, and Comparative Examples 1 to 7, preservation stability was confirmed, and volume resistivity was measured. The results are summarized in Table 2.

[Confirmation of Preservation Stability]

The adhesive was stirred with a rod made of polytetrafluoroethylene, 2.0 cc of the adhesive was weighed, and the viscosity of the adhesive was measured in a state set to 25° C. by a thermostat, using a Brookfield (Type No.: DV-2+Pro). As a measurement condition, CPE-52 (3°×R1.2) was used in a cone rotor, and measurement was performed at a shear rate of 1.0 (1/s). Viscosity after 3 minutes was set as an "initial viscosity (Pa·s)". Thereafter, a non-air permeable ointment container containing the adhesive was stored under an atmosphere at 25° C. Viscosity measurement was performed every 12 hours, until the viscosity was increased by 20% of initial viscosity, and "preservation stability" was determined according to the following evaluation criteria. In order not to change a discharge amount when discharging the adhesive, it is preferred that preservation stability is "○".

Evaluation Criteria
○: more than 24 hours
x: 24 hours or less

[Measurement of Volume Resistivity]

On a glass plate having a thickness of 2.0 mm×a width of 50 mm×a length of 100 mm, a masking tape (having a thickness of 50 μm) was attached to have a length of 100 mm×a width of 10 mm, and the adhesive was squeegeed to form a uniform coated film, thereby manufacturing test pieces (n=2). Each of the test pieces was placed in a hot air drying furnace under an atmosphere at 80° C., allowed to stand for 60 minutes, and taken out of the hot air drying furnace. After the temperature of the test piece was lowered to 25° C., a dual display multimeter having a plate-shaped electrode attached thereon was used to measure "a resistance value (Q)" in a state that a distance between electrodes is 50 mm. Volume resistivity was calculated from (resistance value)×(width of cured product of adhesive×thickness of cured product of adhesive (cross sectional area)/(distance between electrodes), and set as "conductivity ($\times 10^{-6}$ Ω·m)". From the viewpoint of securing conductivity, lower conductivity is preferred.

TABLE 2-1

Comparative Example 1 which was set to be the same as Example 1, except that the component (B): IBX of Example 1 was changed into component (B'): IBXA was compared with Example 1 and reviewed.

Component (A): EBECRYL8402

| Test item | Example 1 | Comparative Example 1 |
|---|---|---|
| Preservation stability | ○ | ○ |
| Conductivity ($\times 10^{-6}$ Ω · m) | 3.0 | 9.0 |

TABLE 2-2

Comparative Example 2 which was set to be the same as Example 2, except that the component (B): HOP (N) of Example 2 was changed into component (B'): HOP-A(N) was compared with Example 2 and reviewed. Component (A): EBECRYL8402.

| Test item | Example 2 | Comparative Example 2 |
|---|---|---|
| Preservation stability | ○ | ○ |
| Conductivity ($\times 10^{-6}$ Ω·m) | 4.0 | 6.0 |

TABLE 2-3

Comparative Example 3 which was set to be the same as Example 3, except that the component (B): IBX of Example 3 was changed into component (B'): IBXA was compared with Example 3 and reviewed. Component (A): AronixM-8030.

| Test item | Example 3 | Comparative Example 3 |
|---|---|---|
| Preservation stability | ○ | ○ |
| Conductivity ($\times 10^{-6}$ Ω·m) | 8.0 | 51.0 |

TABLE 2-4

Comparative Example 4 which was set to be the same as Example 4, except that the component (B): HOP (N) of Example 4 was changed into component (B'): HOP-A(N) was compared with Example 4 and reviewed. Component (A): AronixM-8030.

| Test item | Example 4 | Comparative Example 4 |
|---|---|---|
| Preservation stability | ○ | ○ |
| Conductivity ($\times 10^{-6}$ Ω·m) | 3.0 | 5.0 |

TABLE 2-5

Comparative Example 5 which was set to be the same as Example 5, except that the component (B): IBX of Example 5 was changed into component (B'): IBXA was compared with Example 5 and reviewed. Component (A): EBECRYL220.

| Test item | Example 5 | Comparative Example 5 |
|---|---|---|
| Preservation stability | ○ | ○ |
| Conductivity ($\times 10^{-6}$ Ω·m) | 3.0 | 5.0 |

TABLE 2-6

Comparative Examples 6 and 7 which were set to be the same as Example 1, except that the silver powder which is surface-treated with a component (D); stearic acid of Example 1 was changed into silver powder treated with a different lubricant and untreated silver powder in which a lubricant was not used, respectively, were compared with Example 1 and reviewed.

| Test item | Example 1 | Comparative Example 6 | Comparative Example 7 |
|---|---|---|---|
| Preservation stability | ○ | x | x |
| Conductivity ($\times 10^{-6}$ Ω·m) | 3.0 | 4.0 | 3.0 |

Examples 1 to 5 were compared with Comparative Examples 1 to 5 and reviewed respectively, for the component (B). That is, the component (B) of the Examples is a compound containing a methacryl group, and the component (B') of the Comparative Examples is a compound containing an acryl group. On comparison of the two components for conductivity, though there is a difference in conductivity depending on the type of component (A) and the structure of component (B), it was found that the Examples using the compound containing a methacryl group as the component (B) had lower volume resistivity and good conductivity, in all comparisons. Even in the case of changing the component (A), though there were some differences, the Examples were found to be better. In addition, Examples 1 to 5 using the component (D) which was silver powder which was surface treated with a stearic acid as a lubricant had good preservation stability, however, Comparative Examples 6 and 7 using silver powder treated with a different lubricant and untreated silver powder not using a lubricant, respectively had reduced preservation stability, as compared with Examples 1 to 5.

INDUSTRIAL APPLICABILITY

The thermocurable electroconductive adhesive of the present invention can express low conductivity even with a small amount of added electroconductive particles, and at the same time, has good preservation stability under an atmosphere at 25° C. even in the case of using an airtight container, and also has curability at high temperature for a short time. Thus, there is no change in a discharge amount during a discharge operation for a long time, and at the same time damage by heating on an adherend can be decreased by short time curing. From these features, the adhesive can be used to assemble various electronic components, and the like, and thus, has a possibility to be developed in a wide range of use.

This application is based on Japanese Patent Application No. 2016-173774, filed on Sep. 6, 2016, the disclosure content of which is hereby incorporated as its entirety by reference.

The invention claimed is:

1. A thermocurable electroconductive adhesive consisting of components (A) to (D), or components (A) to (D) and an additive,
    wherein the additive is one or more selected from the group consisting of a stabilizer, inorganic filler, an organic filler, a coloring agent, a flame retardant, an antioxidant, an antifoaming agent, and a levelling agent;

wherein the stabilizer is one or more selected from the group consisting of a phosphate ester compound, a polymerization inhibitor, and a chelating agent;

wherein the polymerization inhibitor is one or more selected from the group consisting of hydroquinone, methoxy hydroquinone, benzoquinone, p-tert-butyl catechol, 2,6-di-tert-butyl phenol, 2,4-di-tert-butyl phenol, 2-tert-butyl-4, 6-dimethyl phenol, 2,6-di-tert-butyl-4-methyl phenol(BHT), 2,4, 6-tri-tert-butyl phenol, alkylated diphenylamine, N,N'-diphenyl-p-phenylene diamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, 2,2,6,6-tetramethylpiperidine-N-oxyl, 4-hydroxy-2,2,6,6-tetramethylpiperidine-N-oxyl, and 4-benzoyloxy-2,2,6,6-tetramethylpiperidine-N-oxyl;

wherein the chelating agent is one or more selected from the group consisting of ethylene diamine-N, N, N', N'-tetraacetic acid disodium salt and ethylene diamine-N, N, N', N'-tetraacetic acid tetrasodium salt;

component (A): an oligomer having a (meth)acryl group;

component (B): a monomer having one methacryl group in a molecule;

component (C): an organic peroxide having the following structure;

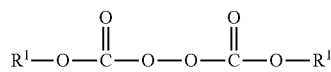

wherein R¹ independently of each other denotes a hydrocarbon group; and component (D): electroconductive particles which are surface-treated with a stearic acid, and wherein a ratio of the component (A) and the component (B) (parts by mass) is 40:60 to 60:40, with respect to a total of 100 parts by mass of the component (A) and the component (B), wherein the component (B) is one or more components selected from the group consisting of methacrylic acid, lauryl methacrylate, stearyl methacrylate, ethyl carbitol methacrylate, tetrahydrofurfuryl methacrylate, caprolactone modified tetrahydrofurfuryl methacrylate, cyclohexyl methacrylate, dicyclopentanylmethacrylate, isobornyl methacrylate, benzyl methacrylate, phenyl methacrylate, phenoxyethyl methacrylate, phenoxy diethyleneglycol methacrylate, phenoxy tetraethyleneglycol methacrylate, nonyl phenoxyethyl methacrylate, nonyl phenoxy tetraethyleneglycol methacrylate, methoxy diethyleneglycol methacrylate, ethoxy diethylene glycol methacrylate, butoxyethyl methacrylate, butoxy triethyleneglycolmethacrylate, 2-ethylhexyl polyethylene glycol methacrylate, nonylphenyl polypropylene glycol methacrylate, methoxydipropyleneglycolmethacrylate, glycidylmethacrylate, 2-hydroxyethyl methacrylate, 2-hydroxypropyl methacrylate, glycerol methacrylate, polyethylene glycol methacrylate, polypropylene glycol methacrylate, epichlorohydrin modified butyl methacrylate, epichlorohydrin modified phenoxy methacrylate, ethylene oxide modified phthalic methacrylate, ethylene oxide modified succinic methacrylate, and caprolactone modified 2-hydroxyethyl methacrylate.

2. The thermocurable electroconductive adhesive according to claim 1, wherein the component (B) is one or more components selected from the group consisting of 2-hydroxyethyl methacrylate, 2-hydroxypropyl methacrylate, polyethylene glycol methacrylate, polypropylene glycol methacrylate, and caprolactone modified 2-hydroxyethyl methacrylate.

3. The thermocurable electroconductive adhesive according to claim 1, wherein the component (C) is an organic peroxide having the following structure:

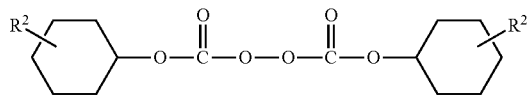

wherein R² independently of each other denotes a hydrocarbon group.

4. The thermocurable electroconductive adhesive according to claim 1, wherein the component (C) is 1 to 10 parts by mass with respect to a total of 100 parts by mass, of the component (A) and the component (B).

5. The thermocurable electroconductive adhesive according to claim 1, wherein the component (D) is 60 to 80% by mass with respect to the entire thermocurable electroconductive adhesive.

* * * * *